Feb. 20, 1962   T. A. SOILEAU, JR   3,022,440
ELECTRIC DISCHARGE DEVICE AND METHODS OF MANUFACTURE
Filed Jan. 29, 1958   2 Sheets-Sheet 1

INVENTOR:
TRASIMOND A. SOILEAU, JR.
BY Philip R. Schlemp
HIS ATTORNEY.

Feb. 20, 1962 T. A. SOILEAU, JR 3,022,440
ELECTRIC DISCHARGE DEVICE AND METHODS OF MANUFACTURE
Filed Jan. 29, 1958 2 Sheets-Sheet 2

INVENTOR:
TRASIMOND A. SOILEAU, JR.
BY Philip L. Schlam
HIS ATTORNEY.

United States Patent Office 3,022,440
Patented Feb. 20, 1962

3,022,440
ELECTRIC DISCHARGE DEVICE AND METHODS OF MANUFACTURE
Trasimond A. Soileau, Jr., Owensboro, Ky., assignor to General Electric Company, a corporation of New York
Filed Jan. 29, 1958, Ser. No. 711,982
15 Claims. (Cl. 313—250)

My invention relates to electric discharge devices and pertains more particularly to electric discharge devices of stacked construction and new and improved means and methods of manufacturing such devices.

In the manufacture of electric discharge devices of stacked construction it is desirable when evacuation is being effected by brazing the envelope elements in a vacuum furnace to hold the envelope wall open during the brazing operation sufficiently long to allow adequate outgassing prior to sealing. Additionally, where such devices include planar grids it is also desirable that they remain taut and planar in the devices while yet being free to expand and contract thermally during manufacture of the tube and subsequently during operation. Still further, it is desirable to avoid in the operation of such devices any deposition of conductive material across the insulative wall sections between conductors, thereby to minimize undesirable electrical leakage between such conductors.

Accordingly, a primary object of the present invention is to provide new and improved means and methods for manufacturing electric discharge devices of stacked construction.

Another object of the present invention is to provide new and improved means and methods for facilitating the evacuation of electric discharge devices of stacked construction.

Another object of the present invention is to provide new and improved grid structures and methods of making same, as well as retaining same taut both during manufacture and subsequent operation of electric discharge devices including such grid structures.

Another object of the present invention is to provide new and improved electric discharge device envelope structures and methods of fabricating same to prevent deposition of short-circuiting conductive deposits across insulative wall sections.

Another object of the present invention is to provide new and improved electrode support structures adapted for facilitating evacuation of electric discharge device envelopes, allowing for differential thermal expansion and contraction of elements comprising electrodes and envelope structures, and retaining grid elements in a taut condition.

Another object of the present invention is to provide a ceramic tube construction which is particularly adapted for high production and low cost manufacture.

Further objects and advantages of my invention will become apparent as the following description proceeds and the features of novelty which characterize my invention will be pointed out with particularity in the claims annexed to and forming part of this specification.

In carrying out the objects of my invention I provide a ceramic and metal electric discharge device structure including alternate ceramic annular wall sections and metal contacts. Interposed between adjacent ceramic sections in a grid structure including a slightly cupped metal washer and a metal mesh element secured at the edges thereof to the outer edge of the washer. The grid structure is made by first cupping a metal washer, then securing the edges of the mesh to the larger edge of the washer and decupping the washer slightly to tighten the mesh. The mesh can be secured to the washer by brazing or by catching the edge thereof between the outer edge of the washer and a retaining ring when the washer is decupped. A metal coil spring interposed between one of the ceramic cylinders and bearing on the washer maintains the grids rigidly positioned and tends to maintain the mesh taut. The coil spring also facilitates evacuation and sealing of the device.

For a better understanding of my invention reference may be had to the accompanying drawing in which.

Figure 1:
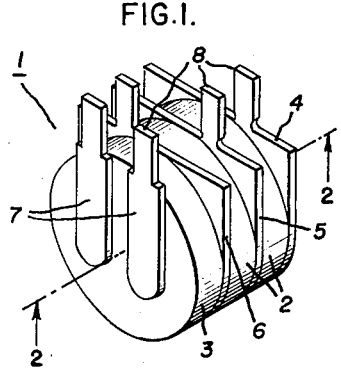
FIGURE 1 is a perspective illustration of a tube of stacked construction manufactured according to the present invention.

Referring to FIGURE 1, there is shown an electric discharge device generally designated 1 and of stacked construction including alternate insulative and conductive elements. The insulative elements can comprise a pair of coaxial cylindrical wall sections 2 and a ceramic disk 3 and the conductive elements can comprise, for example, titanium electrode contacts including disk-like anode, grid, and cathode contacts, 4, 5, and 6, respectively, and a pair of strip-like filament contacts 7. These contacts can include prong-like connectors 8 extending, as shown in FIGURE 1, from one side of the device to enable connection in a suitable circuit, as by insertion in suitable apertures in a printed circuit board. Additionally, on each side of the connectors 8, each of the contacts 4–6 is provided with straight edges which facilitate mounting of the device on a planar surface such as that of a printed circuit board.

Figure 2:
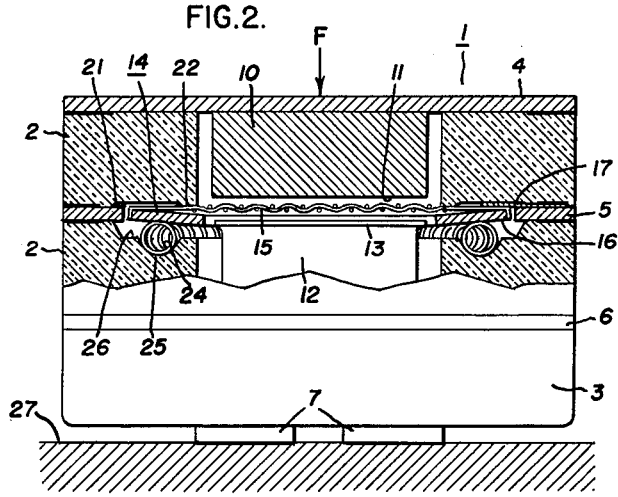
FIGURE 2 is a partially sectionalized enlarged elevational view of the device of FIGURE 1 incorporating one embodiment of my invention.

As perhaps better seen in FIGURE 2, the anode contact 4 is suitably sealed, as by brazing, across the open end of the upper ceramic cylinder 2. Brazed to the inner surface of the contact 4 is a cylindrical anode block 10 including a planar active surface 11. The contact 5 is washer-like or apertured and is suitably sealed between the ceramic cylinders 2. The manner in which this contact is electrically connected and mechanically associated with the grid structure will be described in greater detail hereinafter. The contact 6 is similar to the contact 5 and is suitably sealed between the lower ceramic cylinder 2 and the ceramic disk 3. By means not shown, the contact 6 is mechanically and electrically connected to a cathode support sleeve 12 which carries a planar cathode element 13 in substantially parallel relation to the planar anode surface 11. The contacts 7 are sealed to the outer end surface of the disk 3 and are suitably electrically connected to the opposite ends of a filamentary heater (not shown) disposed in the cathode support 12.

Figure 3:
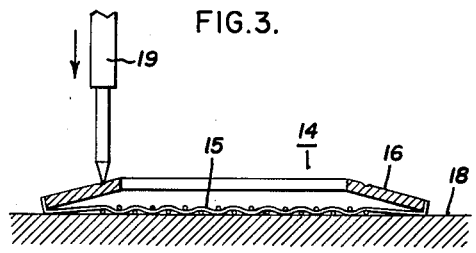
FIGURES 3 and 4 are sectional views of a grid of the type incorporated in the structure of FIGURE 2 and are illustrative of alternative particular steps in the method of manufacture of such a grid.
Figure 4:
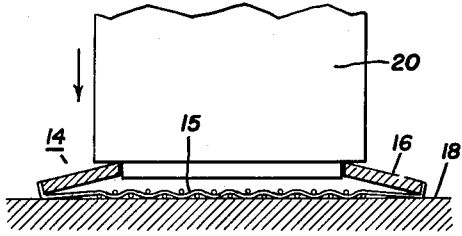

Disposed between the anode and cathode is a grid electrode 14 including a planar array of wires, which, as seen in FIGURES 3 and 4, can be a wire mesh 15, and a shallow frusto-conical washer or cupped element 16. A thin tab 17 formed of Rodar which is a low thermal expansion and low thermal conductivity material available through the Wilbur B. Driver Corporation, or other suitable material, is interposed between the grid and upper ceramic cylinder 2 and spot welded at the outer end to the inner edge of the grid contact 5 for thereby electrically connecting the grid and grid contact. The wire mesh 15 is adjacent the anode block and the smaller annular edge of the washer 16 extends toward the cathode. The mesh 15 extends tautly across the washer and is secured at the edge thereof by brazing to the larger annular edge of the washer 16.

Illustrated in FIGURES 3 and 4 are methods of manufacturing the grid 14 including alternatively employable steps in obtaining the finished article. As seen in both FIGURES 3 and 4, the washer 16 is formed as a cupped or frusto-conical member wherein the section thereof defines an angle of approximately 25 degrees with the horizontal. To the outermost or larger edge of the washer 16 is secured, as by copper brazing, the edge of a grid mesh or screen 15. Then with the mesh down on a supporting surface 18, the washer 16 is decupped or bent toward a flattened condition until the inner edge of the washer is spaced about .015" from the mesh, which tightens the wires comprising the mesh 15. It will be seen from the foregoing that a frusto-conical configuration for the washer will result in a substantially uniform tightening of the grid wires when the washer is flattened. However, for some uses the cupped washer need not be frusto-conical. That is, it can comprise a cupped rectangular washer or can assume various other cupped configurations.

Illustrated in FIGURE 3 is a preferred step of decupping the washer 16. This step involves the use of a pointed decupping die 19 and the application of a downward force on the inclined surface of the washer at equally spaced positions about the washer adjacent the inner edge and in an irregular order. This decupping step requires no substantial exertion of force, enables the amount of force applied to be easily controlled, and is effective for tightening the wires of the mesh without straining them or flattening them under the outer edge of the washer.

Illustrated in FIGURE 4 is an alternative method of decupping the washer. This involves the use of a die 20 adapted for fitting within the smaller rim of the washer and applying a downward force to the inner edge thereof. By using the die 20 the decupping operation can be carried out with one downward movement of the die. This step is particularly adapted for high production use but requires careful control of the downward force applied to the die 20 to avoid flattening of the mesh wires at the outer edge of the washer which would tend to elongate the wires in opposition to the tightening effect of decupping of the washer.

It will be seen that while I prefer using a mesh or reticulate screen 15 in the grid 14, if desired, a planar array of spaced parallel wires without transverse interwoven wires can be alternatively employed. Also, instead of an interwoven mesh, the mesh can be formed by electro-etching or electro-forming which also provide a reticulate structure. Still further, for some applications the mesh need not be planar. For example, it can assume a domed shape.

In the assembled device, and as seen in FIGURE 2, the grid rests against the lower end of the ceramic cylinder 2. A shallow annular recess 21 formed in the end surface of this cylinder provides a shoulder 22. The recess 21 receives the larger edge of washer 16 and the shoulder 22 engages the mesh 15 tending to tighten and hold planar wires thereof. Also, this engagement shortens the unsupported grid span, thereby, to minimize any tendency toward grid wire vibration. Provided for engaging the surface of the washer opposite the mesh for thereby supporting the grid 14 in the position thereof shown in FIGURE 1, is an annular high-refractory metal coil spring 24. The spring 24 can be formed of tungsten wire and, as shown, can be wound from a .0055" wire with a pitch of 10 turns per inch and so as to provide, for the particular tube illustrated, a toroidal center diameter of .630 inch and an individual-turns outside diameter of .068 inch. The spring 24 is retained in an annular recess 25 which is disposed in an annular depression 26 in the upper end of the lower ceramic cylinder 2. In high temperature devices it is desirable to form the spring 24 of a high-refractory metal. However, in relatively low temperature devices the spring 24 can be formed of any metal which will withstand the operating temperature and provide the desired compressive forces on the grid upon cooling after bake-out. Additionally, the various above-described dimensions can be varied to control the compressive forces required.

In manufacturing tubes of the disclosed type the various component parts are first stacked in the assembled arrangement shown in FIGURE 1 and with suitable brazing material between the various elements comprising the envelope structure. Then the stacked assembly is placed in a vacuum or other exhaust furnace and raised to a temperature sufficient for outgassing or releasing occluded gases from the materials of which the parts are formed and melting the brazing material to seal the various envelope parts for obtaining an hermetically sealed evacuated device. In processing the device in the just-described manner, it is desirable that the envelope parts be held apart and sealing delayed during a pre-sealing warmup period during which the outgassing occurs, thus to insure a complete and rapid exhaust of the device during that period. With my means and method the envelope is held open for this purpose by the coil spring 24.

In the exhaust furnace the stacked assembly rests, for example, in a sealing jig 27 in the furnace and a downward force F, generally through the agency of a weight (not shown) is applied to the top of the stack. The outside diameter of the turns of the coil spring 24 holds the ceramic cylinders 2 apart even under a substantial load, such, for example, as a 10 pound weight. Satisfactory sealing is obtainable when a 5 pound weight presses together the surfaces to be sealed. However, at room temperature, the tungsten coil spring is dimensioned and effective for holding the envelope parts in spaced relation even under a 10 pound weight. As the assembly is heated in the vacuum furnace to a temperature at which satisfactory outgassing is effected, the tungsten coil weakens under the effects of the temperature until it is deformed by the force of the 10 pound weight and the envelope parts are pressed together at the junctures to effect the seals therebetween. Tungsten requires approximately 30 minutes at the sealing temperature to anneal. The above-described sealing step requires only approximately 2 minutes. Thus, the tungsten coil retains substantially all of the loading stress which results in its being in compression upon cooling for bearing on the inclined surface of the grid washer and thus holding the washer tightly in place against the upper ceramic 2 and causing the washer to be spring urged to even a more decupped state, thereby to maintain the grid wire taut and coplanar. Additionally, upon cooling, the ceramic forming the lower ceramic cylinder 2 and defining the annular recess 25 contracts more than the tungsten coil for, thus, producing an even greater grid pressure. I have found, for example, that in the device illustrated the final force exerted on the grid by the tungsten spring 24 is in excess of 4.5 pounds. The grid weighs less than a gram; and, therefore, the device is adapted for withstanding substantial acceleration.

In the just-described arrangement for supporting the grid 14, the coil tungsten spring 24 provides a simple and inexpensive means for mounting the grid. The spring requires a minimum of material and its manufacture involves no waste as probably would a punched sheet metal element. Also, no expensive die cost is involved since the spring can be wound on a simple mandrel. The spring 24 is desirable in the disclosed arrangement also because it enables wide control over grid pressure simply by controlling the diameters of the coil and wire and the pitch or turns per inch of the coil.

Figure 5:
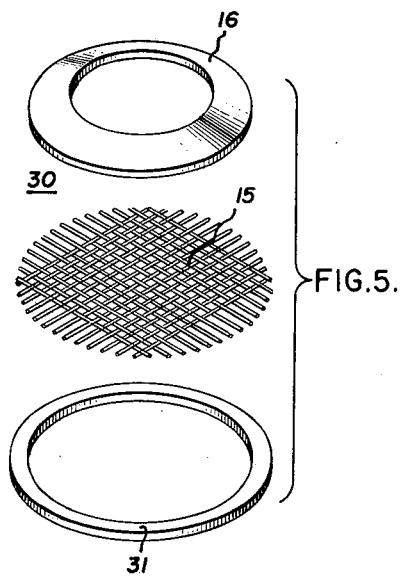
FIGURES 5–7 are illustrative of a modified form of grid structure and modified methods of manufacturing same.
Figure 6:
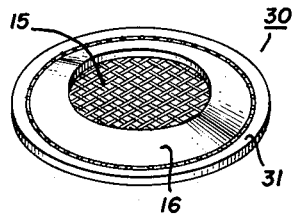
Figure 7:
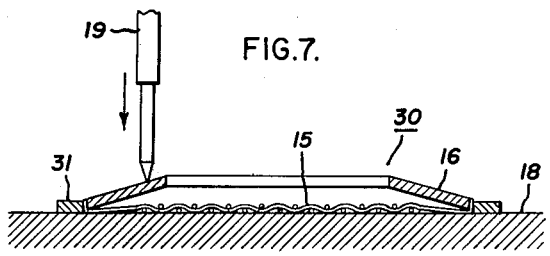

Illustrated in FIGURES 5–7 is a modified grid structure 30 and a method of making same. The grid 30 can include a wire mesh element 15 and a cupped or frusto-conical washer 16 identical to those described above and illustrated in FIGURES 2–4. Instead of brazing the mesh to the washer, however, the edge of the mesh is bent over the outer edge of the washer and the thus acquired assembly is fitted in a metal ring or annulus 31. The washer 16 and annulus 31 can be punched in a single step from a sheet of metal. Then the cupped washer is decupped on a flat surface 18 to the same extent as described above relative to the grid 14 and by means of a pointed die 19 or a die of the type designated 20 in FIGURE 4. In this manner the edge of the grid mesh 15 is caught and thus secured between the outer edge of the washer 16 and ring 31 and the mesh wires are drawn taut. If desired, a braze between the mesh and washer can also be provided.

Figure 8:
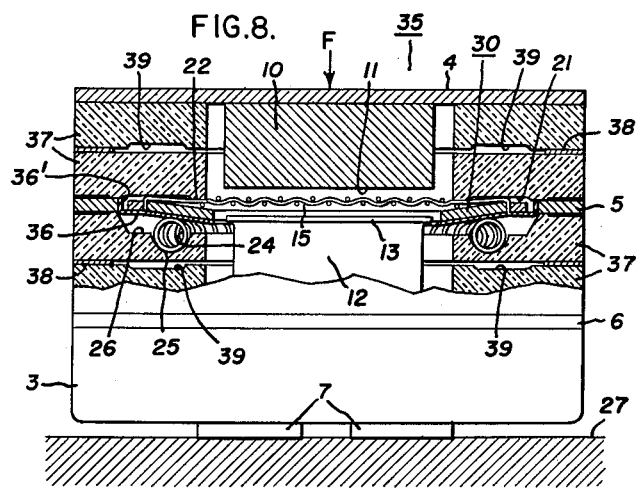
FIGURE 8 is a partially sectionalized enlarged elevational view of another embodiment of my invention wherein is incorporated the modified grid of FIGURES 5–7 and improved envelope wall structures.

Illustrated in FIGURE 8 is a modified embodiment designated 35 of the structure of FIGURE 2. Elements of this embodiment which are identical in form and purpose to those of the structure of FIGURE 2 bear identical numerals and shall not be further described herein.

The structure of FIGURE 8 is different from that of FIGURE 2 in that it includes a grid of the type designated 30 in FIGURES 5–7. Additionally, instead of the electrical connection between the grid 30 and the grid contact 5 being made by a tab, it is made by a thin washer-like grid shield 36. The grid shield 36 includes a central aperture which permits extension therethrough of the cathode and an upturned outer lip 36' which bears against and makes electrical contact with the inner edge of the grid contact 5. The shield 36 is interposed between the grid and tungsten coil spring 24 and is sufficiently flexible to enable the spring 24 to bear on the grid washer in substantially the same manner and for the same purpose as described above with reference to the device of FIGURE 1. Additionally, the spring 24 of the device of FIGURE 8 serves to facilitate evacuation of the device in the same manner as described above with regard to FIGURE 1 and the method of evacuating the device thereof.

As also illustrated in FIGURE 8, each of the insulative wall sections of the envelope on either side of the grid contact 5 comprises a composite structure including a pair of annular ceramic cylinders 37. The cylinders 37 are of substantial wall thickness and the cylinders of each pair are slightly longitudinally spaced. Additionally, the cylinders of each pair are soldered together only in the region adjacent the outer edges at 38. This defines substantial spaces extending outwardly from the inner edges of the cylinders or in other words leaves the areas of the opposed end surfaces of the cylinders 37 unconnected in areas extending from the inner edges substantially outwardly to the outer edges. Additionally, it leaves, as pointed out above, a space which I prefer to be of approximately .002 inch. As seen in FIGURE 8, these spaces are longitudinally offset or vertically spaced relative to the plane of the cathode 13 and, indeed, the active surfaces of all of the electrodes in the envelope. This small separation and relative disposition of the spaces provides a substantially long surface leakage path which is substantially inaccessible to deposition of conductive material which evolves during manufacture and operation of devices of this type. Thus, the inner cylindrical surfaces of each of the paths of ceramic cylinders 37 can become substantially heavily coated with deposited material and yet not create a complete electrically conductive path across the sections 37 comprising each pair thereof.

To increase the inaccessibility of the surfaces connecting the ceramic cylinders of each pair, I have provided in the end surface of at least one of the ceramic cylinders of each pair thereof an annular recess 39 spaced outwardly of the inner edges and inwardly of the outer edges of the ceramic cylinders. This arrangement provides surfaces which cannot be reached by straight line sublimation which might originate anywhere in the tube.

While I have shown and described specific embodiments of my invention, I do not desire my invention to be limited to the particular forms shown and described, and I intend by the appended claims to cover all modifications within the spirit and scope of my invention.

What I claim as new and desire to secure by Letters Patent of the United States is:

1. An electric discharge device comprising an envelope containing a spaced anode and cathode, a pair of longitudinally arranged annular insulators comprising wall sections of said envelope and having said anode and cathode extending therein, a grid structure interposed between the opposed inner ends of said insulators and between said anode and cathode, said grid structure including a slightly cupped washer and an array of wires extending across the concave side of said washer and secured to the outer edge of said washer, and means resiliently bearing on the inclined surface of said washer for supporting said grid structure and maintaining taut said array of wires.

2. An electric discharge device comprising an envelope containing a spaced anode and cathode, a pair of longitudinally arranged annular insulators comprising wall sections of said envelope and having said anode and cathode extending therein, a conductive annular contact interposed between the opposed inner ends of said insulators, a grid structure interposed between the opposed inner ends of said insulators between said anode and cathode and electrically connected to said grid contact, said grid structure including a frusto-conical washer and a planar array of wires secured to the outer edge of said washer, and an annular coil spring mounted on the inner end of one of said insulators and bearing on the inclined surface of said washer for supporting said grid structure against the inner end of the other of said insulators and maintaining taut said array of wires.

3. An electric discharge device comprising a hermetically sealed envelope containing a spaced anode and cathode, a pair of coaxial annular insulators comprising wall sections of said envelope and having said anode and cathode extending therein, a conductive annular contact interposed between the opposed inner ends of said insulators, a grid structure interposed between the opposed inner ends of said insulators between said anode and cathode and electrically connected to said grid contact, said grid structure including a frusto-conical washer and a planar array of wires secured to the outer edge of said washer, and an annular high-refractory metal coil spring mounted on the inner end of one of said insulators and bearing on the inclined surface of said washer for supporting said grid structure against the inner end of the other of said insulators and maintaining taut said array of wires, and an annular conductive shield interposed between said washer and coil spring, said shield including an edge electrically connected to said annular contact.

4. An electric discharge device comprising an envelope containing a spaced anode and cathode, a pair of coaxial cylindrical insulators comprising wall sections of said envelope and having said anode and cathode extending therein, a grid structure interposed between the opposite inner ends of said insulators and between said anode and cathode, said grid structure including a frusto-conical washer and an array of wires extending across the concave side of said washer and secured to the outer edge of said washer, each of said inner ends of said insulators including an annular recess, one of said inner ends including a shoulder defined by the recess therein and engaging the wires of said grid, the other of said recesses retaining a coil spring bearing on the inclined surface of said washer and supporting said grid structure against the shoulder on the other of said insulators with said array of wires bearing on said shoulder.

5. In the method of processing an electric discharge device in a furnace in which the envelope of said device must be maintained open to the atmosphere of said furnace for a predetermined interval, the steps of interposing between adjacent sections of said envelope a thermally operative sealing material, applying a force tending to press said sections into sealing relation with said material, and interposing between said opposing sections a resilient member effective for opposing said force and maintaining said sections apart below a predetermined temperature of said furnace and which will weaken and deform under said force at an elevated temperature sufficient only to enable said force to bring said sections into sealing relation with said sealing material.

6. In the method of furnace processing an electric discharge device including a planar grid comprising a frusto-conical washer and a metal mesh secured to the outer edge of said washer and a pair of coaxial ceramic cylinders comprising a section of the envelope wall of said device comprising the steps of interposing said grid between the opposed inner ends of said cylinders, disposing a brazing material between the upper edges of said opposed inner ends of said cylinders, applying force to press said cylinders into sealing relation with said brazing material, interposing between said grid and one of said cylinders and in engagement with the inclined surface of said washer an annular tungsten coil effective for opposing said force and maintaining said cylinders apart below a predetermined temperature of said furnace and which will weaken and deform under said force at an elevated temperature sufficient only to enable said force to bring said cylinders into sealing relation with said brazing material, and upon cooling will resiliently bear on said inclined surface of said washer to maintain said grid firmly supported against the end of the other of said cylinders with said mesh tightly drawn.

7. An electric discharge device comprising an envelope containing a plurality of electrodes, a pair of stacked cylindrical insulators comprising a wall section of said envelope, said insulators including opposed planar end surfaces having a joint therebetween, said joint extending only partially inwardly from the outer edges of said end surfaces, thereby to provide an annular space disposed between unjoined portions of said opposed end surfaces and extending substantially outwardly from the inner edges of said insulators, said space being void, spaced from all metal material in said envelope and longitudinally spaced from the active portions of said electrodes, whereby said unjoined portions of said opposed ends are rendered substantially inaccessible to the deposition of conductive material during processing and operation of said device.

8. An electric discharge device according to claim 7, wherein the unjoined surface portions of the planar end surface of at least one of said insulators includes an annular recess spaced outwardly from the inner edge of said insulator, whereby greater inaccessibility is provided.

9. A grid structure comprising a concave circular washer, and a metal mesh including a pair of sets of mutually perpendicular wires extending in a plane including the outer edge of said washer and having the ends of said wires secured to only the outer edge of said washer on the concave side thereof.

10. A grid structure comprising a frusto-conical washer, and a metal mesh including a pair of sets of mutually perpendicular wires extending in the plane of the outer edge of said washer and having the edge of said mesh secured to the outer edge of said washer.

11. A grid structure comprising a concave circular washer, a metal mesh including a pair of sets of mutually perpendicular wires extending across the concave side of said washer and having the ends of said wires bent over the outer edge of said washer, and a retaining ring wherein said washer is press fitted for securing said mesh to said washer.

12. The method of manufacturing a grid comprising the steps of cupping a circular metal washer, extending a mesh including a pair of sets of mutually perpendicular metal wires across the concave side of said washer and securing the wires of said mesh to only the outer edge of said washer, and pressing said washer toward a decupped condition for tightening said wires.

13. The method of manufacturing a grid comprising the steps of cupping a circular metal washer, extending a mesh including a pair of mutually perpendicular metal wires in the plane of the outer edge of said washer, securing the ends of said wires to only the outer edge of said washer, and pressing said washer toward a decupped condition by applying in an irregular order a force to the inclined surface of said washer at circumferentially spaced points with a pointed die for tightening said wires.

14. The method of manufacturing a grid comprising the steps of cupping a circular metal washer, extending a mesh including a pair of sets of mutually perpendicular metal wires in the plane of the outer edge of said washer, securing the edge of said mesh to only the outer edge of said washer, and pressing said washer toward a decupped position by directing a circumferentially applied force to the inner edge of said washer, for pressing said washer toward a decupped position to tighten said wires.

15. The method of manufacturing a grid comprising the steps of cupping a circular metal washer, placing a mesh including a pair of sets of mutually perpendicular wires over the concave side of said washer and bending the ends of said wires over the outer edge thereof, fitting said washer in a retaining ring and pressing said washer toward a decupped condition for thereby securing the ends of said wires between said washer and ring and tightening said wires.

References Cited in the file of this patent

UNITED STATES PATENTS

| | | |
|---|---|---|
| 2,378,164 | Van Den Bosch et al. | June 12, 1945 |
| 2,402,119 | Beggs | June 18, 1946 |
| 2,455,868 | Koch | Dec. 7, 1948 |
| 2,624,100 | Foulkes | Jan. 6, 1953 |
| 2,784,337 | Barnes | Mar. 5, 1957 |
| 2,861,211 | Brown et al. | Nov. 18, 1958 |

FOREIGN PATENTS

| | | |
|---|---|---|
| 1,040,108 | France | May 20, 1953 |
| 202,665 | Australia | Aug. 18, 1955 |